United States Patent [19]
Grimmett et al.

[11] Patent Number: 5,839,051
[45] Date of Patent: Nov. 17, 1998

[54] HOST RADIO TELEPHONE TO DIRECTLY ACCESS A HANDSET NAM THROUGH A CONNECTER WITHOUT REQUIRING THE HANDSET CONTROLLER TO BE EMPLOYED

[75] Inventors: Alan Charles Grimmett, Guildford, England; N E Martensson, Woking, United Kingdom; Simon Philip O'Neill, Bracknell, United Kingdom; Roger Wilkins, Sherborne St John, United Kingdom

[73] Assignee: Technophone Limited, Ashwood House, United Kingdom

[21] Appl. No.: 963,658

[22] Filed: Nov. 3, 1997

Related U.S. Application Data

[60] Continuation of Ser. No. 67,294, May 25, 1993, abandoned, which is a division of Ser. No. 925,516, Aug. 5, 1992, Pat. No. 5,259,018, which is a continuation of Ser. No. 469,249, Jan. 23, 1990, abandoned.

[30] Foreign Application Priority Data

Mar. 17, 1989 [GB] United Kingdom .................... 8906218

[51] Int. Cl.$^6$ ....................................................... H04Q 7/32
[52] U.S. Cl. ........................................... 455/11.1; 455/550
[58] Field of Search .................................... 455/550, 11.1

[56] References Cited

U.S. PATENT DOCUMENTS

| | | | |
|---|---|---|---|
| 4,122,304 | 10/1978 | Mallien | 179/2 |
| 4,677,653 | 6/1987 | Weiner et al. | 379/58 |
| 4,720,855 | 1/1988 | Ohnishi et al. | 379/354 |
| 4,752,949 | 6/1988 | Steinbeck et al. | 379/61 |
| 4,893,348 | 1/1990 | Andoh | 455/89 |
| 5,029,233 | 7/1991 | Metroka | 455/11 |
| 5,142,573 | 8/1992 | Umezawa | 379/454 |
| 5,170,494 | 12/1992 | Levanto | 455/90 |
| 5,249,018 | 9/1993 | Grimmett et al. | 379/58 |
| 5,249,302 | 9/1993 | Metrolca et al. | 455/11.1 |

OTHER PUBLICATIONS

DYNA TAC Cellular Mobile Telephone General Description, Motorola Inc., Technical Writing Services, Jun. 15, 1983, pp. 1–3.

Radio Shack, 1988 Catalog, pp. 2, 4, 5, Index p. 93.

*Primary Examiner*—William Cumming
*Attorney, Agent, or Firm*—Perman & Green, LLP

[57] ABSTRACT

A cellular radio telephone system comprises a mobile cellular telephone (1) adapted to have a hand portable telephone (2) containing a number assignment module, i.e. a NAM (7), removably connected thereto. The mobile telephone (1) has a microprocessor (4) which can access the information stored in the NAM (7) of the hand portable telephone (2) either directly or via a memory 16 whereby the mobile automatically assumes the telephone number of the hand portable telephone when the two telephones are connected together. Hence a subscriber need only have a single billing account for both telephones. Also, the same mobile telephone may be used as a host at different times by any number of subscribers having their own hand portable telephones. Each subscriber will be able to receive his own calls and the charges for using the system can be levied to the appropriate subscriber's account.

5 Claims, 4 Drawing Sheets

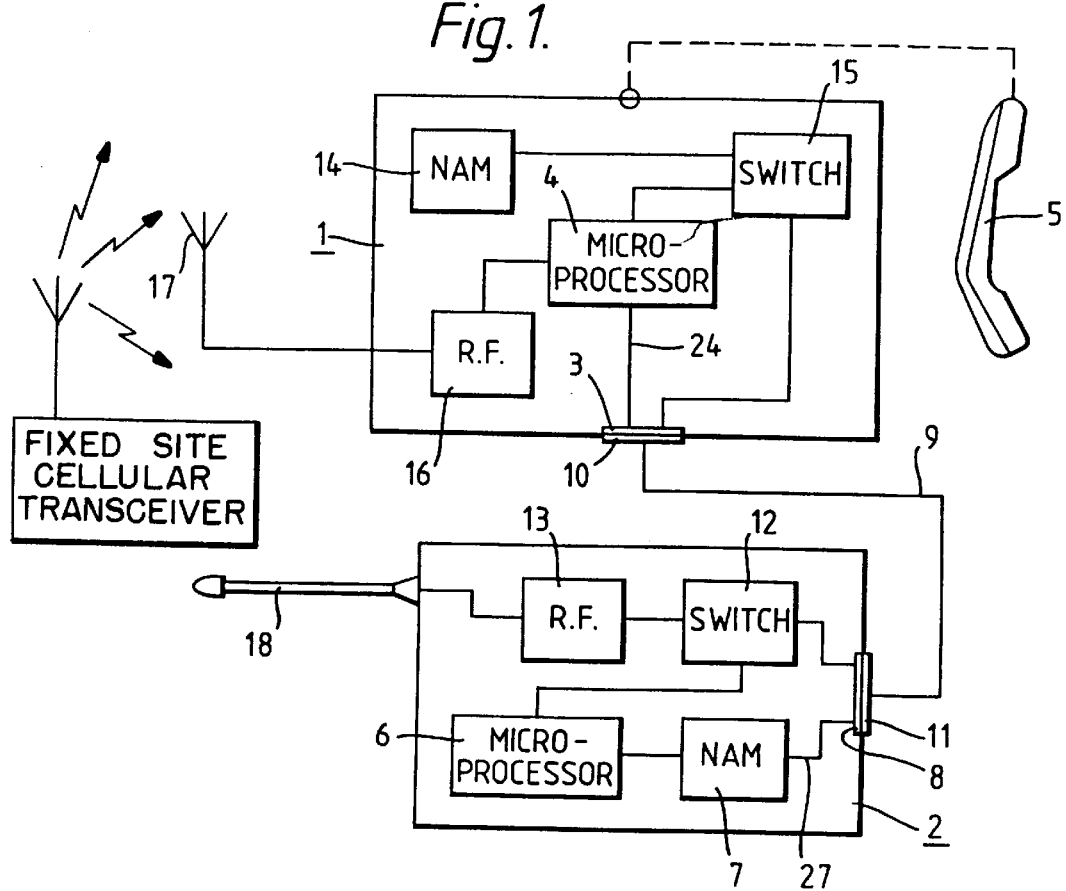
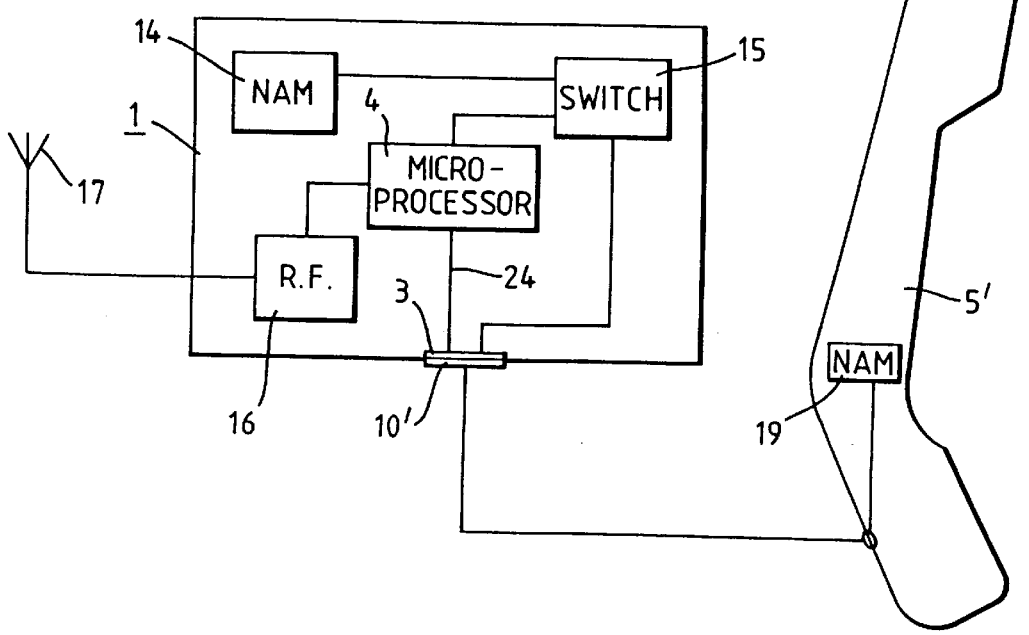

HOST RADIO TELEPHONE TO DIRECTLY ACCESS A HANDSET NAM THROUGH A CONNECTER WITHOUT REQUIRING THE HANDSET CONTROLLER TO BE EMPLOYED

This application is a continuation of application Ser. No. 08/067,294 filed on May 25, 1993, now abandoned which is a divisional application of Ser. No. 07/925,516, filed Aug. 5, 1992 (now U.S. Pat. No. 5,259,018), which is a continuation application of Ser. No. 07/469,249, filed on Jan. 23, 1990 (now abandoned).

This invention relates to a radio telephone system, particularly but not exclusively a cellular radio telephone system, comprising a host telephone and handset means containing a number assignment module (NAM) in which is stored a unique telephone number.

BACKGROUND OF THE INVENTION

By way of background explanation, the cellular radio telephone system divides a geographical area into a plurality of adjoining cells each including a stationary transmitting and receiving base station connected to the conventional fixed-wire telephone network. Each cell is designed to allow a cellular telephone within the cell to access the fixed-wire network, and vice versa. Hence, the particular cell which receives the transmitting and/or receiving signal of a cellular telephone is the cell which is made operative for transmitting and/or receiving the call. So, for example, when a cellular telephone user attempts to make a call, the cell whose base station receives the strongest signal will be the one which effects the connection for that call. If the cellular telephone then moves beyond the effective range of the cell originally handling the call, another cell which receives the signal more strongly will become operative by an automatic transfer or 'hand-over' system. Hand-over may occur many times during a call depending on the distance travelled by the telephone and the number of effective cells through which the telephone passes.

Each cellular telephone includes a call-channel selector which controls a frequency synthesizer to span the available call-channel frequencies and, in combination with a microprocessor, selects the call-channel received most strongly, ie. from the cell base station closest to the telephone.

Cellular radio telephones fall into two main categories, namely mobiles and hand portables, although there is also an intermediate category known as transportables. As the name implies, a hand portable telephone is relatively lightweight and small in size and operates from an internal, rechargeable battery pack so that it may readily be carried around by the user. A mobile telephone, on the other hand, is permanently installed in a vehicle and operates from the vehicle's own (higher voltage) power supply. A mobile has the advantage over a hand portable that it can transmit at a higher power level, but a hand portable has the advantage that the user does not need to be in or near a vehicle to use the telephone, since it can be used anywhere within range of a base station. Unlike a mobile telephone, however, a hand portable does have the drawback of having a limited stand-by and call time before the internal battery pack needs to be recharged. Thus, mobiles and hand portables each have their own particular benefits, and it is not uncommon for a subscriber to have both types of telephone, each with its own unique identity, that is to say the mobile telephone would have one telephone number and the hand portable would have a different telephone number, each with its own billing account. Alternatively, a hand portable telephone may be used in the vehicle with a special booster unit operated from the vehicle's power supply, but this involves additional apparatus and more expense.

Conventionally, each cellular telephone—whether mobile or hand portable—has its own unique telephone number by which it may be accessed from other cellular telephones or fixed-wire conventional telephones. The full telephone number is stored in a memory, e.g. a ROM, PROM or RAM known in the art as a 'number assignment module' (NAM) coupled to the control circuits, usually a microprocessor, of the cellular telephone. In the case of mobile telephones the NAM is traditionally contained in the so-called transceiver unit located in a convenient (usually concealed) place separate and remote from the handset, the handset being connected to the transceiver unit.

It is noted that the terms 'number assignment module' and 'NAM' as used herein encompass any memory means, not necessarily modular in form, nor dedicated to the NAM function, in which information pertaining to the identity of the telephone, specifically the telephone number, is stored.

U.S. Pat. No. 4,677,653 and U.S. Pat. No. 4,734,928 disclose an adapter for a cellular mobile telephone which converts the telephone to have any one of several different telephone numbers selected manually by the user. The adapter is provided with a plurality of number assignment modules (i.e. NAMs) in the form of respective ROMs, each storing a unique telephone number. The ROMs (or NAMs) are mounted on a main circuit board in a housing separate from the telephone unit. Each NAM is connected to a multi-position switch so that a selected one of the NAMs may be coupled to the microprocessor of the telephone to change the telephone number. These U.S. Patents essentially extend the concept of a cellular telephone having its own unique telephone number by teaching that each telephone may indeed be adapted to have several unique numbers, any one of which may be active (all the others being dormant) at any one time and the user would have a different billing account for each number. Although the same principle could also be applied to hand portable telephones, the overriding doctrine remains to provide cellular telephones with exclusive telephone numbers, that is to say each telephone either has its own individual telephone number or a unique set of telephone numbers exclusive to that particular telephone.

In the neighbouring art of cordless radio telephones, British Patents Nos. 2,154,395 and 2,159,372 disclose an arrangement of handset and base unit, in which the base unit automatically generates and stores an identification code, and then transmits the same code to the handset over the air. The handset stores the code in memory. When an incoming or outgoing call is initiated, the two identification codes stored in the base unit and the handset, respectively, are compared and only if they match is the call allowed to proceed. The identification codes stored in the base unit and handset are thus provided for security purposes i.e. to prevent crosstalk and the risk of wire tapping in that they prevent a handset being used with any base unit other than its intended partner. Provision is made to enable a plurality of handsets to be operable with a common base unit, but each of the handsets can be used only with the particular base unit (or units) to which it is paired and no other. Moreover, in the case of cordless telephones it is noted that the base unit and the handset, although separate, constitute a single telephone and therefore only have one unique telephone number associated therewith. Furthermore, it is noted that this telephone number does not need to be stored in memory within any part of the telephone since the base unit is connected to the fixed-wire telephone network and hence can be addressed in the conventional manner. There is therefore no equivalent of a number assignment module in the case of a cordless telephone.

SUMMARY OF THE INVENTION

According to a first aspect of the present invention there is provided a radio telephone system comprising host radio telephone means and handset means, wherein the host telephone means is adapted to have the handset means removably connected thereto, characterized in that the handset means contains a number assignment module (NAM) in which is stored a number identifying the handset means, the handset means is adapted to provide read access to said NAM from outside the handset means, and the host telephone means is provided with means for accessing said NAM in the handset means whereby the host telephone means assumes automatically the identifying number of the handset means when the handset means is connected to the host telephone means.

In a radio telephone system in accordance with the invention the handset means lends its own inherent identity (telephone number(s)) to the host telephone means while the handset means is temporarily connected to the host. Hence, a common host may be used by any number of different subscribers having their own handset means and they will each be able to make and receive calls on their own personal telephone numbers and the charges for using the system can be levied to the respective subscriber's billing account. Conversely, an individual subscriber may connect his personal handset means to any convenient host telephone means and he will be able to make and receive calls on his personal telephone number and, furthermore, the charges for using the system can be levied to his particular billing account.

The host telephone means may contain its own NAM and so be fully operable as a telephone in its own right with its own unique telephone number. Nevertheless, whenever a handset means containing its own NAM in accordance with the invention is connected thereto, the host will automatically assume the telephone number of the handset means regardless of its own inherent number.

Hence in accordance with a particular embodiment of the invention there is provided a radio telephone comprising a host radio telephone having a first number assignment module (NAM) in which is stored a telephone number identifying the host telephone, and telephone handset means containing a second NAM in which is stored a telephone number identifying the handset means, characterized in that the host telephone is adapted to have the handset means removably connected thereto, the telephone handset means is adapted to provide read access to the second NAM from outside the handset means, and the host telephone is provided with means for accessing the second NAM whereby the host telephone assumes automatically the identifying telephone number of the handset means when the handset means is connected to the host telephone.

The handset means may be a telephone handset unit in its own right or may be a complete hand portable radio telephone. In the latter case the hand portable may be provided with switching means which automatically disable at least some of the R.F. circuits of the hand portable telephone when it is connected to the host, since the host will have the identity of the hand portable and the hand portable telephone is itself otherwise redundant except for possible use as a handset.

The radio telephone system of the invention may suitably be a cellular system. The host telephone may be a mobile cellular telephone and the handset means may be a hand portable cellular telephone. In this case, when the hand portable is connected to the mobile, the mobile assumes the telephone number of the hand portable unit so that both telephones may be operated with the same telephone number.

In a preferred embodiment the radio telephone system includes means capable of detecting the connection of the handset means to the host telephone, wherein the host telephone comprises control circuitry to which the first NAM is coupled, and switching means responsive to the detecting means which disconnect the first NAM from the control circuitry when the handset means is connected to the host telephone. The host thus behaves schizophrenically, resuming its own inherent telephone number when the handset means is disconnected, but assuming the identity of the handset means when the handset means is connected. Such a switching means is not, however, essential. Without it, the host telephone may operate with both telephone numbers simultaneously when the handset means is connected.

In one embodiment the host telephone may be arranged to read the NAM information directly from the handset means whenever the handset means is connected to the host. In an alternative embodiment, the host telephone comprises memory means for storing NAM information from the handset means, and means are provided for transferring information from the NAM of the handset means to the memory means automatically when the handset means is connected to the host.

Means may also be provided for erasing the information stored in the memory means automatically when the handset means is disconnected from the host. Fresh NAM information can thus be stored in the memory means the next time a handset means is connected to the host telephone. Additionally, the handset means may comprise memory means for storing variable information, such as abbreviated dialling codes or frequently used telephone numbers entered by the subscriber, and the host telephone may comprise a corresponding memory, means being provided to download information from the memory means in the handset means to the corresponding memory in the host telephone automatically when the handset means is connected to the host telephone. Similarly, information may be transferred from the host telephone to the handset means.

According to another aspect of the invention there is provided a host radio telephone for use in the radio telephone system in accordance with the first aspect, adapted to have removably connected thereto a telephone handset means containing a number assignment module (NAM) storing a telephone number identifying the handset means, the host telephone having means for accessing the NAM whereby the host telephone automatically assumes the identifying telephone number of the handset means when the handset means is connected to the host telephone.

According to another aspect of the invention there is provided a telephone handset for use as the handset means in the radio telephone system in accordance with the first aspect, adapted to be removably connected to the host telephone and containing a number assignment module (NAM) for storing a telephone number identifying the handset, the handset means being adapted to provide read access to the NAM from outside the handset means.

BRIEF DESCRIPTION OF THE DRAWINGS

Embodiments of the invention will now be described, by way of example, with reference to the accompanying drawings, in which:

FIG. 1 illustrates schematically a first embodiment of a cellular radio telephone system in accordance with the invention, FIG. 2 illustrates schematically a second embodiment of the invention.

DETAILED DESCRIPTION OF THE DRAWINGS

Figure 2A:
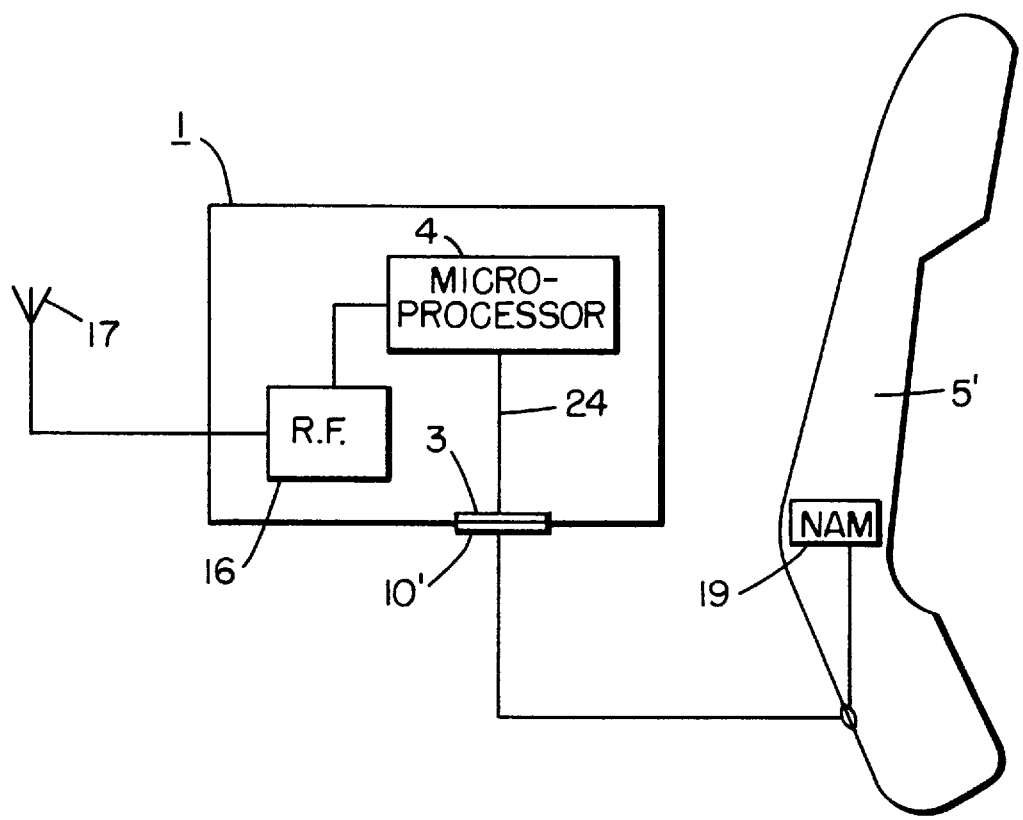
FIG. 2a illustrates schematically an embodiment of the invention wherein a host radio telephone has no independent NAM.

Referring to FIG. 1, there is shown schematically a mobile cellular radio telephone 1 connected to a hand portable cellular radio telephone 2. A fixed site cellular transceiver, i.e. a base station, communicates with the mobile and hand portable telephones 1 and 2, in the known manner. As is conventional, the mobile telephone comprises a transceiver with R.F. circuits 16 connected to an external antenna 17 and coupled to a microprocessor 4. The mobile telephone has its own inherent telephone number by virtue of a NAM 14 contained within the main unit of the mobile telephone. A dedicated handset 5 is connected to the main unit in known manner. However, unlike conventional mobile apparatus, the present mobile telephone has an external connector 3, e.g. an 18 pin socket 3, known per se, coupled to the microprocessor 4 of the mobile telephone by an internal data link 24 and the NAM 14 is coupled to the microprocessor 4 via a switch 15 as explained in more detail below.

The hand portable telephone 2 comprises its own microprocessor 6 and a NAM 7 coupled thereto containing the telephone number of the hand portable unit. The NAM 7 is connected by an internal data link 27 to an external connector 8, e.g. an 18 pin socket, on the outer casing of the hand portable telephone 2.

The hand portable and mobile telephones are mutually connected by a wire (electrical) data link 9 having plugs 10 and 11 at opposite ends which mate with sockets 3 and 8 in the mobile and hand portable telephones respectively. A conventional logical switch 12 within the hand portable telephone 2 detects when connection is made to the mobile telephone 1 and disables the R.F. circuits 13 of the hand portable so that the hand portable ceases to operate as an independent radio telephone. When the telephones 1 and 2 are disconnected the switch 12 reconnects the R.F. circuits so that the hand portable telephone 2 resumes normal operation.

When the two telephones 1 and 2 are connected as shown in FIG. 1, the NAM 7 of the hand portable telephone 2 is coupled via a fixed-wire electrical datalink 9, to the microprocessor 4 of the mobile telephone 1. The microprocessor 4 thus has direct access to the telephone number information stored in NAM 7. Also, the NAM 14 of the mobile telephone 1 is coupled to the microprocessor 4 via a conventional logical switch 15 which detects whether or not a hand portable telephone 2 is connected. When the hand portable is connected the switch 15 is opened to disconnect internal NAM 14 so that the microprocessor 4 only has access to the information in the NAM 7 of the hand portable telephone 2, but not to the NAM 14 of the mobile 1. The mobile thus assumes the identity of the hand portable telephone. When the hand portable is disconnected, however, the switch 15 is closed to couple the internal NAM 14 to the microprocessor 4 whereby the mobile resumes its own inherent telephone number.

The hand portable telephone 2 may be used as the handset for the mobile, in which case the audio circuits (not shown) remain operational when the telephones are connected, and this avoids the need for using the dedicated handset 5. However, the hand portable unit may be inconvenient and cumbersome to use as a handset inside a vehicle, because of its relatively heavy weight, fixed antenna, and trailing connector lead 9, in which case the dedicated handset 5, or a conventional so-called "hands-free" apparatus, permanently connected to the mobile unit 1, may be utilised. In this case the audio circuits of the hand portable telephone 2 may also be disabled when the two telephones are connected together.

FIG. 2 shows an embodiment in which an ancillary handset 5' is removably connected to the mobile telephone 1 via a connector 10'. The handset 5' contains its own NAM 19 in which is stored an exclusive telephone number identifying the handset. Operationally this arrangement is analogous to the previous embodiment with the ancillary handset 5' taking the place of the hand portable telephone 2. Thus, when the handset 5' is connected, the mobile telephone 1 becomes operative with the telephone number in the handset NAM 19, and, as can be appreciated in view of the above-description, it can be said that the handset 5' resides in an active state since communications to and from the handset 5' may be made through the mobile telephone 1 (before the elements 5' and 1 are coupled together, the handset 5' is considered to be in a passive state, wherein the handset 5' is incapable of independently communicating with a fixed site). In this case switch 15 is responsive to the connection of an ancillary handset, and disconnects NAM 14 when an ancillary handset 5' is connected.

In a modified version of the FIG. 2 embodiment the NAM 14 and switch 15 within the mobile unit may be omitted (as shown in FIG. 2a), the microprocessor 4 simply having direct read access to the NAM 19 in the handset 5' whenever the handset is connected. The mobile unit 1 does not have a dedicated handset and can be regarded as a latent telephone in that it does not contain its own inherent identity and only becomes operable as a telephone when a handset containing its own NAM is connected thereto. This adds a new dimension of versatility to conventional mobile telephones since the same mobile unit can be used by any number of different subscribers equipped with appropriate NAM-containing handsets and the telephone as a whole assumes the identity of the particular handset which is connected for the duration of the connection.

It is noted that what is referred to herein as the mobile unit need not be contained within a single unitary housing. In particular the handset may be connected to a transceiver unit of the telephone via intermediate means, typically a cradle on which the handset is placed either when the telephone is not in use or when it is being used in a "handsfree" mode. The cradle is conventionally fixedly mounted within the passenger compartment of the vehicle for ready access to the handset, whilst the transceiver unit may be located in any convenient place within the vehicle, e.g. in the trunk or beneath one of the seats.

Figure 3:
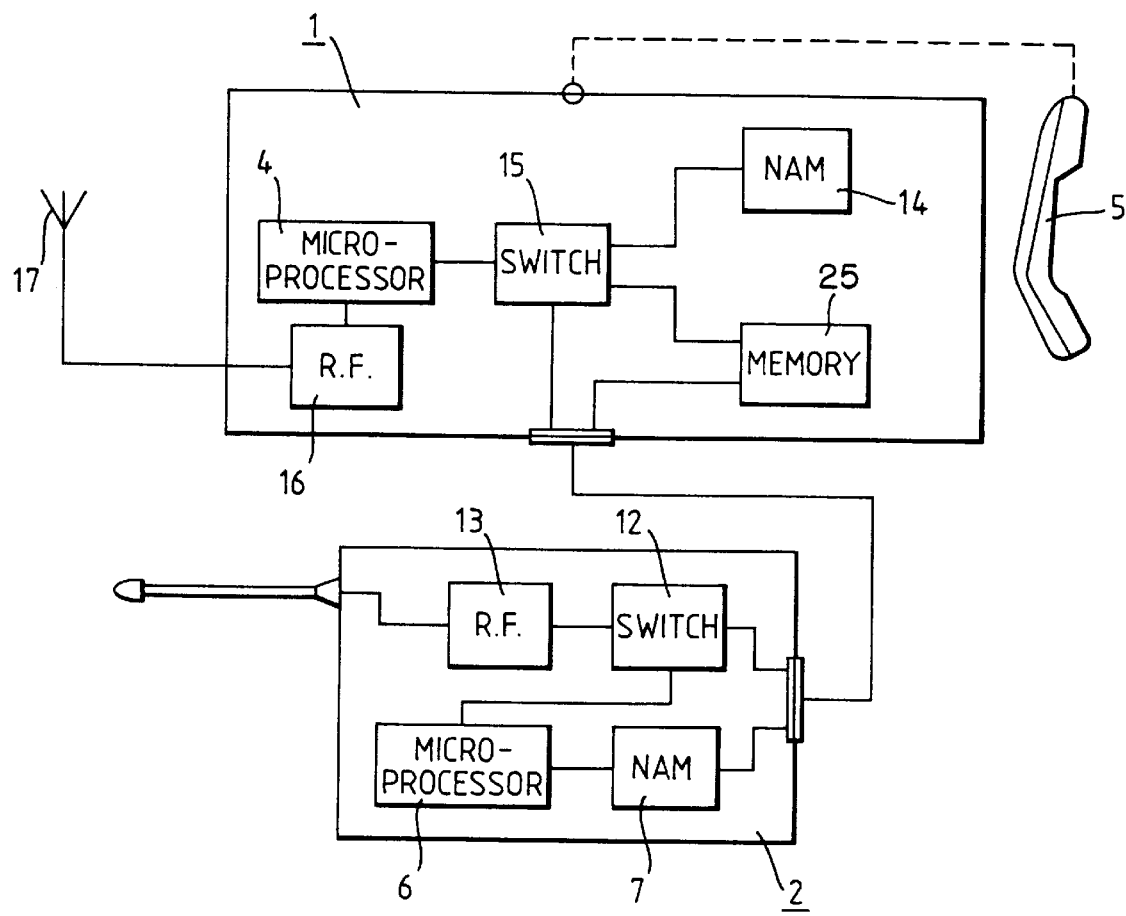
FIG. 3 illustrates schematically a third embodiment.

FIG. 3 shows an arrangement in which the mobile telephone 1 also comprises a programmable memory 16 into which information from the NAM 7 in the hand portable telephone is downloaded automatically when the two telephones are connected together. In this case the microprocessor 4 is coupled to the memory 25 rather than directly to the NAM 7. The NAM 14 and memory 25 are coupled to the microprocessor 4 via a switch 15 which detects whether or not a hand portable telephone is connected. When a hand portable is connected, NAM 14 is isolated and memory 25 is coupled to microprocessor 4 so that the mobile telephone assumes the identity of the hand portable telephone 2. When the hand portable telephone is disconnected, memory 25 is isolated and NAM 14 is coupled to the microprocessor 4 so that the mobile telephone resumes its own inherent telephone number. Also, when the hand portable telephone is disconnected the memory 25 may be erased under the control of the microprocessor 4.

As a variation to the FIG. 3 embodiment, the handportable telephone 2 may be substituted by an ancillary handset containing its own NAM as described with reference to the previous embodiments.

Figure 4:
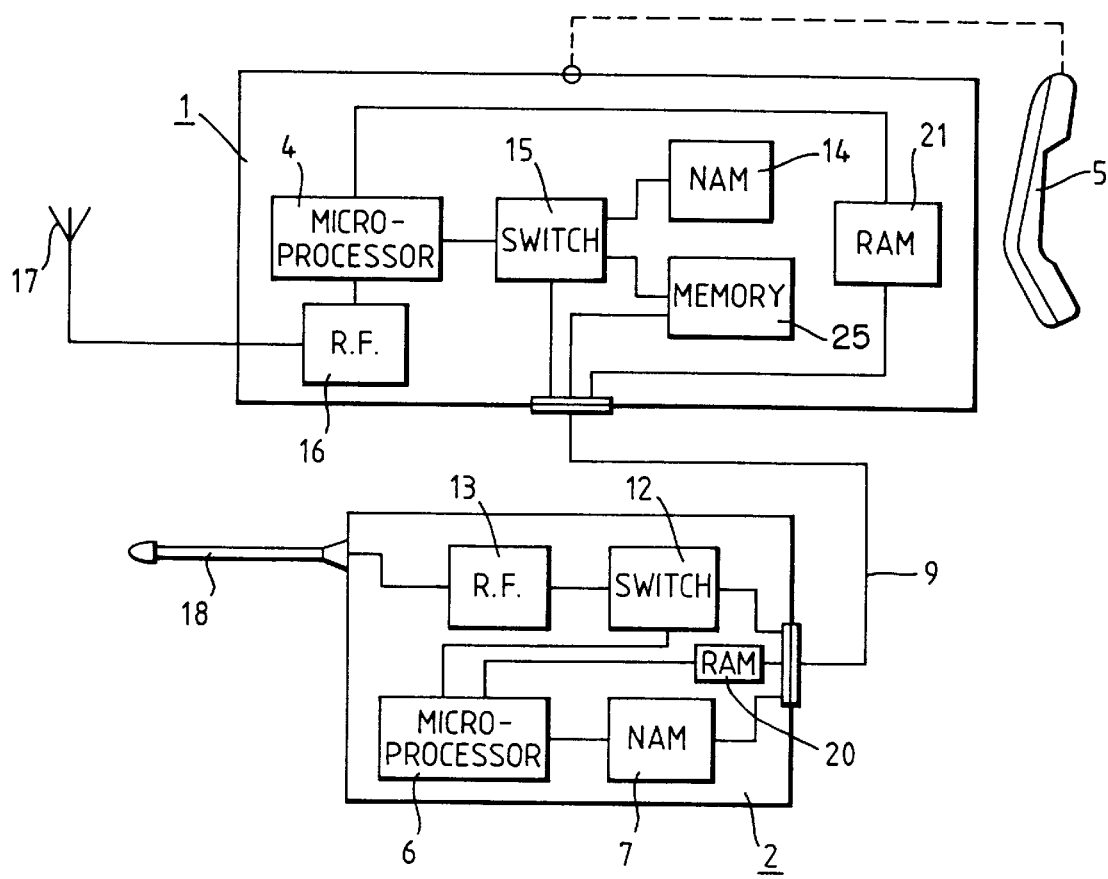
FIG. 4 illustrates schematically a further embodiment of the invention.

FIG. 4 shows a modification of the arrangement in FIG. 3 wherein the hand portable telephone 2 additionally has a random access memory or RAM 20 coupled to microprocessor 6 and the mobile telephone 1 has a corresponding RAM 21 coupled to microprocessor 4. Variable data may be entered into RAM 20 by the user, e.g. abbreviated dialling codes, frequently dialled telephone numbers, or other data. When the telephones 1 and 2 are connected together the data in RAM 20 is compared with data already held in RAM 21. Those memory locations which are not duplicated may be transferred automatically from RAM 20 to RAM 21 via data link 9 in known manner. Hence the mobile telephone 1 may take on not only the telephone number but other data stored in the hand portable telephone without rekeying.

In view of the foregoing description it will be evident that various modifications may be made within the scope of the present invention. For example, it is not necessary for the NAM 14 to be disconnected from the microprocessor 4 when a handportable telephone or ancillary handset is connected to the mobile, since both NAMs may remain coupled whereby the mobile telephone may simultaneously have two (or more) telephone numbers. In this case the switch 15 may be dispensed with. On the other hand the switch 15 need not itself be capable of detecting when an external device is connected to the mobile. Instead this function may be carried out by independent detection means well known to the person skilled in the art and the switch would then operate in response to the detection means, and switching may be effected under software control for example by the internal microprocessor. Furthermore, the NAMs in the telephones or the ancillary handset are not restricted to containing a single telephone number, but may contain several different numbers. As regards the data link between the two telephones this need not be a fixed-wire electrical link (as described), but may alternatively be an optical or radio data link.

Finally, it is noted that the invention is not limited to cellular radio telephone systems, but applies equally to any radio telephone system, for example the discrete area system known in the UK as CT2.

We claim:

1. A telephone handset that is only capable of providing telephonic communication when connected to a host radio telephone, said telephone handset comprising:

connector means for removably connecting said telephone handset to a host radio telephone, for enabling a user of said telephone handset to communicate on a radio system only while said telephone handset is connected to said host radio telephone, wherein said radio system includes at least one fixed site and a plurality of radio telephones; and a telephone handset number assignment module for storing an identification number identifying the telephone handset for communication with a fixed site, both for outgoing and incoming calls occurring only while said telephone handset is connected to said host radio telephone, said telephone handset number assignment module being accessed only while said telephone handset is connected to said host radio telephone such that said telephone handset is otherwise incapable of independently communicating with the fixed site;

wherein said connector means connects said host radio telephone to said telephone handset number assignment module of said telephone handset for enabling said host radio telephone to directly access said identification number from the telephone handset number assignment module through said connector means, without requiring that a controller be employed in said telephone handset for enabling said host radio telephone to access said identification number.

2. The telephone handset as recited in claim 1, wherein said connector means provides for transfer of said identification number from the telephone handset number assignment module by the host radio telephone when said telephone handset number assignment module and said host radio telephone are connected via said connector means.

3. A telephone handset, said telephone handset residing in one of only an active state and a passive state, wherein while residing in said active state, said telephone handset is connected to an external host radio telephone which renders the telephone handset capable of communicating with at least one fixed communication site through said host radiotelephone, and while residing in said passive state, said telephone handset is disconnected from said host radio telephone and is incapable of independently communicating with any communication site, said telephone handset comprising a connector for removably connecting said telephone handset to said host radio telephone for causing said telephone handset to reside in one of said active or passive states; a telephone handset number assignment module, said telephone handset number assignment module storing an identification number identifying the telephone handset for communication with the at least one fixed communication site during both incoming and outgoing calls occurring while said telephone handset resides in said active state; wherein said connector connects said host radio telephone to said telephone handset number assignment module of said telephone handset for enabling said host radio telephone to directly access said identification number from the telephone handset number assignment module through said connector, without requiring that a controller be employed in said telephone handset for enabling said host radio telephone to access said identification number, and wherein said connector also provides for transfer of said identification number from the telephone handset number assignment module to said host radio telephone while said telephone handset number assignment module and said host radio telephone are connected through said connector.

4. A portable telephone handset for use in a communications network, the communications network including a host radio transceiver and at least one fixed site, said host radio transceiver including at least one RF transceiver component that includes an antenna, said at least one RF transceiver component for coupling said host radio transceiver to said at least one fixed site through said antenna and a wireless interface, said portable telephone handset comprising:

a connector for removably connecting said portable telephone handset to said host radio transceiver for enabling said portable telephone handset to communicate with said at least one fixed site through said at least one RF transceiver component only while said portable telephone handset is connected to said host radio transceiver, said portable telephone handset otherwise being incapable of independently communicating with the at least one fixed site; and a number assignment module, said number assignment module storing an identification number identifying the portable telephone handset for communication with said at least one fixed site through said at least one RF transceiver component during both incoming and outgoing calls occurring while said portable telephone handset is connected to said host radio transceiver;

wherein said connector connects said host radio transceiver to said number assignment module for enabling said host radio transceiver to directly access said identification number from said number assignment module of said portable telephone handset through said connector, without requiring that a controller be employed in said portable telephone handset for enabling said host radio transceiver to access said identification number.

5. A portable telephone handset as recited in claim 4, wherein said portable telephone handset does not have an integral antenna, and wherein while said portable telephone handset is connected to said host radio transceiver said portable telephone handset is coupled through said connector to said antenna of said at least one RF transceiver component of said host radio transceiver.

* * * * *